United States Patent Office 3,278,615
Patented Oct. 11, 1966

3,278,615
STABILIZATION OF HALOALKANES WITH
FLUOROETHERS OF THE TYPE

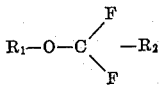

Eric R. Larsen and Ralph A. Davis, Midland, Mich., and Jerry R. Lacoume, Lake Jackson, Tex., assignors to The Dow Chemical Company, Midland, Mich., a corporation of Delaware
No Drawing. Filed Apr. 8, 1963, Ser. No. 271,508
6 Claims. (Cl. 260—652.5)

This invention relates to stabilized compositions of matter, and to a process for inhibiting the reaction of haloalkanes and metals such as aluminum.

It is well known that haloalkanes are attacked by metals such as aluminum and alloys containing aluminum. In the resulting reaction, the haloalkanes are polymerized and the aluminum is consumed. An effective stabilizer system is needed for these halogenated solvents because of the intended solvent uses, e.g., dry cleaning or vapor degreasing. Trichloroethylene and perchloroethylene, for example, are frequently used for degreasing metals such as aluminum and iron. With uninhibited solvents, metal chlorides are formed in the degreasing operation and act as catalysts for the further decomposition of the solvent. This decomposition of the solvent results in the formation of tars which are deposited upon the metal parts.

It is an object of the present invention to provide stabilized haloalkane solvents. A further object of the invention is to provide a method for reducing the decomposition of haloalkanes by metals such as aluminum.

It has now been discovered that these and other objects may be accomplished by incorporating an inhibiting amount of a fluorinated ether into the haloalkane solvent.

The fluoroethers which are employed as inhibitors are saturated compounds characterized by the presence of a difluoromethylene group which is attached to an ether oxygen atom. These compounds may be represented by the formula

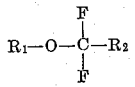

wherein each of $R_1$ and $R_2$ are organic groups of from 1 to 10 carbon atoms or halosubstituted organic groups of from 1 to 10 carbon atoms. $R_1$ is preferably a lower alkyl group of from 1 to 4 carbon atoms (methyl, ethyl, n-propyl, i-propyl, n-butyl, i-butyl and sec.-butyl), a corresponding lower haloalkyl group (wherein the halo moiety is Cl, Br, I or F), a lower alkoxyalkyl group with a total of from 2 to 8 carbon atoms (such as 2-methoxyethyl, 3-ethoxypropyl or 1-methoxyethyl), or the corresponding halogenated lower alkoxyalkyl groups of from 2 to 8 carbon atoms in which each alkyl group contains from 1 to 4 carbon atoms (such as 2,2,2-tri(2-chloro-1,1,2-trifluoroethoxymethyl)ethyl group and the 2-(dichloromethoxy)ethyl group). Typical fluoroethers which may be used as inhibitors for haloalkanes include 2-chloro-1,1,2-trifluoroethyl methyl ether, 2-chloro-1,1-difluoroethyl methyl ether, 2-chloro-1,1,2-trifluoroethyl 2,2,2-trifluoroethyl ether (2,2,2-trifluoro-1-(2-chloro-1,1,2-trifluoroethoxy)ethane), 2 - bromo-1,1,2-trifluoroethyl methyl ether, 2,2-dichloro-1,1-difluoroethyl methyl ether, 2-chloro-1,1,2-trifluoroethyl chloromethyl ether, 2,2-dichloro-1,1-difluoroethyl ethyl ether, 1,1,2,2-tetrafluoroethyl sec.-butyl ether, 2,2-dichloro-1,1-difluoroethyl isopropyl ether, 2,2-dichloro-1,1,2-trifluoroethyl trichloromethyl ether and tetrakis[2 - chloro-1,1,2 - trifluoroethoxymethyl]-methane. $R_2$ is suitably a halogenated (F, Cl, Br, I) lower alkyl group of from 1 to 4 carbon atoms; at least one of the halogen atoms is preferably different from fluorine (i.e., a Cl, Br or I atom). $R_2$ may contain from 1 to 9 halogen atoms. Examples of suitable $R_2$ groups include trichloromethyl, tribromomethyl, difluoromethyl, iododifluoromethyl, 4,4-dichlorobutyl, 2,2-dichloro-1,1,2-trifluoroethyl and 3-chloro-2,2-dibromo-1,1-difluoropropyl groups. Other suitable fluorine-containing ethers which may be used as inhibitors are disclosed in U.S. Patents 2,803,665 and 2,803,666 to Miller et al.

The ability of fluoroethers to prevent the reaction of aluminum and haloalkanes is a general property of saturated fluoroethers. Concentrations of the fluoroethers of up to about 25 volume percent may be used, but generally, from 0.1 to 20 volume percent of fluoroether is sufficient to inhibit the decomposition of the haloalkane by aluminum. Only an inhibiting amount of fluoroether stabilizer is required and amounts of fluoroether less than 0.1 volume percent give only very slight inhibition against metal-solvent reaction. Typical haloalkanes which may be stabilized by the addition of fluoroethers include carbon tetrachloride, carbon tetrabromide, n-butyl bromide, bromochloromethane, bromotrichloromethane, dibromodichloromethane, dibromodifluoromethane, ethyl bromide, lauryl bromide, methyl bromide, methylene bromide, trimethylene chlorobromide, chloroform, 1,1,1-trichloroethane, 1,1-dichloroethane, ethyl chloride, isopropyl chloride, methyl chloride, methylene chloride, 1,1,2-trichloroethane, 1,2-dibromo-1,1-dichloroethane, 1,3-dibromo-1,1,2-trichloropropane, 1-chloro-2-bromoethane, 1,2-dibromo - 3 - chloropropane and 1,1,1-trichloro-3-bromopropane. While any haloalkane which attacks aluminum may be successfully inhibited by incorporating up to about 25 volume percent of saturated fluoroethers, the inhibitors are most advantageously employed with commercially useful haloalkane solvents. Thus, haloalkanes with from 1 to 20 carbon atoms (and preferably from 1 to 4 carbon atoms and up to 10 halogen atoms) with up to 20 halogen atoms (Cl, Br. I, F) in the molecule form a particularly important class of commercial solvents which may be stabilized with saturated fluoroethers.

One method of preparing the fluoroethers used as inhibitors and stabilizers in the present invention is by the base catalyzed addition of an alkanol or haloalkanol to a polyfluoroalkene. Such a method is disclosed by Hanford et al. in U.S. Patent No. 2,409,274. Another method is by the reaction of polyhaloalkyl ethers (such as pentachloroethyl methyl ether) with antimony trifluoride to form fluorinated ethers (such as 1,1-difluoro-2,2,2-trichloroethyl methyl ether). Still another method of preparing suitable fluoroether inhibitors (such as 1,1,2,2-tetrafluoro-2-bromoethyl methyl ether and 1,1,2-trifluoro-2,2-dichloroethyl methyl ether) involves the selective replacement of bromine atoms in an ether compound (such as 1,2,2-trifluoro-1,1-dibromoethyl methyl ether and 1,2-dibromo-1-fluoro-2,2-dichloroethyl methyl ether) with fluorine atoms using a specialized fluorination agent such as bromine trifluoride ($BrF_3$).

The use of saturated fluoroethers as stabilizers and inhibitors to retard the reaction of haloalkanes and aluminum offers several advantages over other inhibiting systems. For example, the fluoroethers are relatively non-toxic, have a low degree of flammability, have a wide variety of boiling points (so that the fluoroether inhibitor can be chosen to closely match the boiling point of any given haloalkane solvent), have low water solubility (and are, therefore, not extracted by water), have a low degree of chemical activity, are hydrolytically stable and are not oxidized by oxygen or ozone.

In addition, the fluoroethers are particularly useful as inhibitors and stabilizers because they have been found to be effective in both the liquid and vapor state. Various mixtures of fluoroethers may be used to tailor the inhibitor properties to the particular haloalkane solvent.

The following examples are submitted for the purpose of illustration only and are not to be construed as limiting the scope of the invention in any way.

EXAMPLES I–IV

Squares of commercially available aluminum foil (one inch by one inch) of approximately .001 inch in thickness were placed in the various samples of polyhaloalkanes containing the indicated amounts of 2-chloro-1,1,2-trifluoroethyl methyl ether ($CH_3OCF_2CHClF$) and the aluminum foil scratched with a knife to initiate the reaction. All reactions were carried out at ambient room temperature (16°–30° C.). The results are summarized in Table 1.

TABLE 1

| Example Number | Haloalkane | Volume Percent of $CH_3OCF_2CHClF$ Inhibitor | Result |
|---|---|---|---|
| I | $BrCHCl-CHClBr$ | 0 | Slow reaction, solution black after 16 hours. |
| | | [1] 9.1 | No attack after 240 hours. |
| II | $BrCH_2-CHBr-CH_2Cl$ | 0 | Slow reaction, solution black in 16 hours. |
| | | 9.1 | No attack after 240 hours. |
| III | $CCl_2H-CH_2-CH_2Br$ (Cl-C(Cl)(H)-C(H)(H)-C(H)(H)-Br) | 0 | Slow bubble formation, solution black after 240 hours. |
| | | 9.1 | No attack after 240 hours. |
| IV | $ClCH_2-CH_2Br$ | 0 | Solution dark brown after 16 hours; black after 240 hours. |
| | | 9.1 | No attack after 240 hours. |

[1] 1 ml. of inhibitor to 10 ml. of alkane.

EXAMPLES V–VIII

It is known that $CBrCl_2CHClBr$ reacts much more violently with aluminum foil than does $CCl_3CH_3$. Therefore, $CBrCl_2CHClBr$ was employed as the haloalkane to be stabilized in order to provide a more stringent test of the inhibiting power of the fluoroethers. The experiments were conducted as in Examples I–IV and the results are summarized in Table 2.

TABLE 2

| Example Number | Fluoroether Inhibitor | Volume Percent Concentration of Fluoroether in Haloalkane ($BrCl_2CCBrClH$) | Result |
|---|---|---|---|
| V | $CH_3OCF_2CHClF$ | 0 | Aluminum destroyed 1 minute after being scratched. |
| | | 9.1 | No attack after 240 hours. |
| VI | $CCl_3OCF_2CCl_2F$ | 0 | Aluminum destroyed 1 minute after being scratched. |
| | | 9.1 | No attack after 240 hours. |
| | | 16.6 | No attack after 240 hours. |
| VII | $(CH_3)_2CH-O-CF_2CHCl_2$ | 0 | Aluminum destroyed 1 minute after being scratched. |
| | | 9.1 | No attack after 240 hours. |
| VIII | $C(CH_2OCF_2CHClF)_4$ | 0 | Aluminum destroyed 1 minute after being scratched. |
| | | [1] (<9.1%) | No attack after 240 hours. |

[1] Saturated solution.

EXAMPLES IX–XIII

Sample strips (63 mm. x 12 mm. x 1 mm.) of aluminum alloy were weighed and placed in 500 milliliter flasks fitted with reflux condensers. The alloy used was one of the more reactive aluminum alloys with the following composition (percent by weight): Cu 3.8–4.9 percent, Mg 1.2–1.8 percent, Si 0.5 percent, Fe 0.5 percent, Mn 0.3–0.9 percent, Cr 0.1 percent, Zn 0.25 percent and remainder aluminum. Reagent grade carbon tetrachloride (250 milliliters) was added to each flask with different amounts of 2-chloro-1,1,2-trifluoroethyl methyl ether ($CH_3OCF_2CHClF$). The solutions were brought to reflux and, after forty minutes, the surface of each strip was scratched with a pointed nickel spatula. The results are summarized in Table 3.

TABLE 3

| Example Number | Volume Percent Concentration of Fluoroether ($CH_3OCF_2CHClF$) in Haloalkane ($CCl_4$) | Exposure Time (hours) | Weight Loss (grams) |
|---|---|---|---|
| IX | 0 | 22 | [1] 0.4258 |
| X | 7.4 | 22 | 0 |
| XI | 7.4 | 144 | 0 |
| XII | 1.18 | 24 | 0 |
| XIII | 1.18 | 288 | 0.0001 |

[1] Reaction with the aluminum alloy started immediately after scratch.

As shown by Table 3, the reaction between the aluminum alloy and carbon tetrachloride was completely prevented by the fluoroether ($CH_3OCF_2CHClF$) inhibitor.

EXAMPLES XIV–XVI

Sample strips (63 mm. x 12 mm. x 1 mm.) of the same alloy used in Examples IX–XIII were weighed and placed in a condenser. One strip of aluminum alloy was mounted so that the condenser condensate and hot vapor passed over the strip. Another strip was placed in the boiling liquid. Methyl chloroform (with and without inhibitor) was refluxed and the aluminum strips removed periodically and weighed. The results are summarized in Table 4.

TABLE 4

| Example Number | Volume Percent Concentration of Fluoroether ($CH_3OCF_2CHClF$) in Haloalkane ($CH_3CCl_3$) | Total (Cumulative) Exposure Time (Hours) | Total (Cumulative) Weight Loss (Grams) |
|---|---|---|---|
| XIV (Strip mounted in vapor) | 3.0 (194 ml. of $CH_3CCl_3$ and 6 ml. of $CH_3OCF_2CHClF$) | 0 | |
| | do | 17 | 0.0005. |
| | do | 23 | 0.0007. |
| | do | 39.5 | 0.0008. |
| XV (Strip mounted in refluxing liquid) | 3.0 (194 ml. of $CH_3CCl_3$ and 6 ml. of $CH_3OCF_2CHClF$) | 0 | |
| | do | 17 | 0.0009. |
| | do | 23 | 0.0013. |
| | do | 39.5 | 0.0020. |
| | 0 | 0 | Indication of attack within 1 minute after exposure to hot vapors. |
| XVI (Strip mounted in vapor) | 0 | 0.5 | 0.8303—Solution black, corrosion had proceeded to a point that allowed strip to fall into refluxing liquid. |

Table 4 shows that the fluoroether inhibitor is effective in both the liquid and vapor state.

EXAMPLES XVII–XX

In a manner identical with the procedure employed in Examples I–IV, 1,1,2,2-tetrafluoro-2-bromoethyl methyl ether and 1,1,2-trifluoro-2,2-dichloroethyl methyl ether were dissolved in 1,1,2-trichloro-1,2-dibromoethane (one milliliter of ether in 10 milliliters of haloalkane, a 9.1 volume percent solution) and a strip of aluminum foil added. The foil was scratched and torn with a stainless steel spatula and allowed to stand in the inhibited haloalkane at ambient room temperature for a 48-hour period. No reaction was observed. A slight yellowing of the inhibited solution occurred due to the photo decomposition of 1,1,2-trifluoro-1,2-dibromoethane. The test was repeated using methyl chloroform in place of 1,1,2-trifluoro-1,2-dibromoethane. No corrosion occurred after a 24-hour period. The results are summarized in Table 5.

TABLE 5

| Example Number | Haloalkane | Inhibitor and Volume Percent Concentration | Result |
|---|---|---|---|
| XVII | Br—C(Cl)(Cl)—C(Cl)(Br)—H | $CH_3OCF_2CF_2Br$, 9.1 | No attack after 48 hours. |
| XVIII | Br—C(Cl)(Cl)—C(Cl)(Br)—H | $CH_3OCF_2CFCl_2$, 9.1 | Do. |
| XIX | $CCl_3CH_3$ | $CH_3OCF_2CF_2Br$, 9.1 | No attack after 24 hours. |
| XX | $CCl_3CH_3$ | $CH_3OCF_2CFCl_2$, 9.1 | Do. |

We claim as our invention:

1. A stabilized haloalkane which contains a stabilizing amount of a saturated fluoroether of the formula

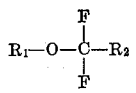

wherein:
(a) $R_1$ is selected from the group consisting of lower alkyl, lower haloalkyl, a lower alkoxyalkyl group wherein each alkyl moiety contains from 1 to 4 carbon atoms, and a lower halogenated alkoxyalkyl group of from 2 to 8 carbon atoms, and
(b) $R_2$ is a lower haloalkyl group.

2. Stabilized 1,2-dibromo-1,1,2-trichloroethane which contains a stabilizing amount of an ether selected from the group consisting of 2-chloro-1,1,2-trifluoroethyl methyl ether, 2,2-dichloro-1,1,2-trifluoroethyl trichloromethyl ether, 2,2-dichloro-1,1-difluoroethyl isopropyl ether and tetrakis[2-chloro-1,1,2-trifluoroethoxymethyl]-methane.

3. Stabilized carbon tetrachloride which contains from 0.1 to 25 volume percent of 2-chloro-1,1,2-trifluoroethyl methyl ether.

4. Stabilized methyl chloroform containing from 0.1 to 25 volume percent of 2-chloro-1,1,2-trifluoroethyl methyl ether.

5. A method of retarding the reaction of haloalkanes and metal which comprises contacting said metal with a haloalkane in the presence of a fluoroether of the formula of claim 1.

6. A method of retarding the reaction of haloalkanes with aluminum which comprises contacting aluminum with a haloalkane in the presence of a fluoroether of the formula

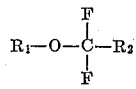

wherein:
(a) $R_1$ is selected from the group consisting of lower alkyl, lower haloalkyl, a lower alkoxyalkyl wherein each alkyl moiety contains from 1 to 4 carbon atoms, and a lower halogenated alkoxyalkyl group of from 2 to 8 carbon atoms, and
(b) $R_2$ is a lower haloalkyl group.

References Cited by the Examiner
UNITED STATES PATENTS

| | | | |
|---|---|---|---|
| 2,371,645 | 3/1945 | Aitchison et al. | 260—652.5 |
| 2,818,446 | 12/1957 | Starks | 260—652.5 |

LEON ZITVER, *Primary Examiner.*

DANIEL D. HORWITZ, *Examiner.*

M. M. JACOB, *Assistant Examiner.*